US006296362B1

(12) United States Patent
Tinti et al.

(10) Patent No.: US 6,296,362 B1
(45) Date of Patent: Oct. 2, 2001

(54) VIBRATION HARDENED MIRROR MOUNT WITH ALIGNMENT FRIENDLY LOCKING

(75) Inventors: Robert Tinti, Torrance; Caesar C. Florentino, Palos Verdes; Douglas M. Bell, Fountain Valley, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/659,793

(22) Filed: Sep. 12, 2000

(51) Int. Cl.[7] .................................................. G02B 7/182
(52) U.S. Cl. .......................... 359/871; 359/872; 359/874; 359/875; 359/876
(58) Field of Search ...................... 359/871, 872, 359/874, 875, 876, 841, 201–203, 220, 221, 223, 226; 356/138, 153, 345, 346

(56) References Cited

U.S. PATENT DOCUMENTS

| 3,970,369 | * | 7/1976 | Wachsman | 359/871 |
| 4,637,695 | * | 1/1987 | Perkins | 359/871 |
| 5,486,917 | * | 1/1996 | Carangelo et al. | 356/346 |
| 5,805,325 | * | 9/1998 | Clune | 359/226 |
| 5,841,594 | * | 11/1998 | Rothe | 359/841 |

* cited by examiner

Primary Examiner—Mohammad Sikder
(74) Attorney, Agent, or Firm—Noel F. Heal

(57) ABSTRACT

A precision mirror mount that is adjustable and able to be securely locked in angular orientation about two perpendicular axes (20, 30), to a high degree of angular resolution. A mirror (10) is bonded to a mirror cell (12), to which is rigidly connected a rod (18). The rod (18) engages a hole in a block 22 and is rotatable to adjust the angular orientation of the mirror about a first rotation axis. The block 22 is part of a mount stage (14) that also includes a second rod (26) designed to engage a hole in another block (28) that is part of a mirror mount stand (16). Rotation of the mount stage (14) about the axis (30) of the second rod (26) provide for mirror adjustment about a second rotation axis. Each of the blocks (22, 28) has a slot (34, 42) and a locking screw (36, 44) that together form locking mechanisms that clamp the respective rods (18, 26) to prevent unwanted angular movement. Each of the blocks (22, 28) also has a second slot (32, 40) that serves to isolate locking forces and to minimize any unwanted movement of the mirror. Removable mirror mount adjustment tooling (60) may be used to make angular adjustments to the mirror (10) before locking the mirror position.

12 Claims, 2 Drawing Sheets

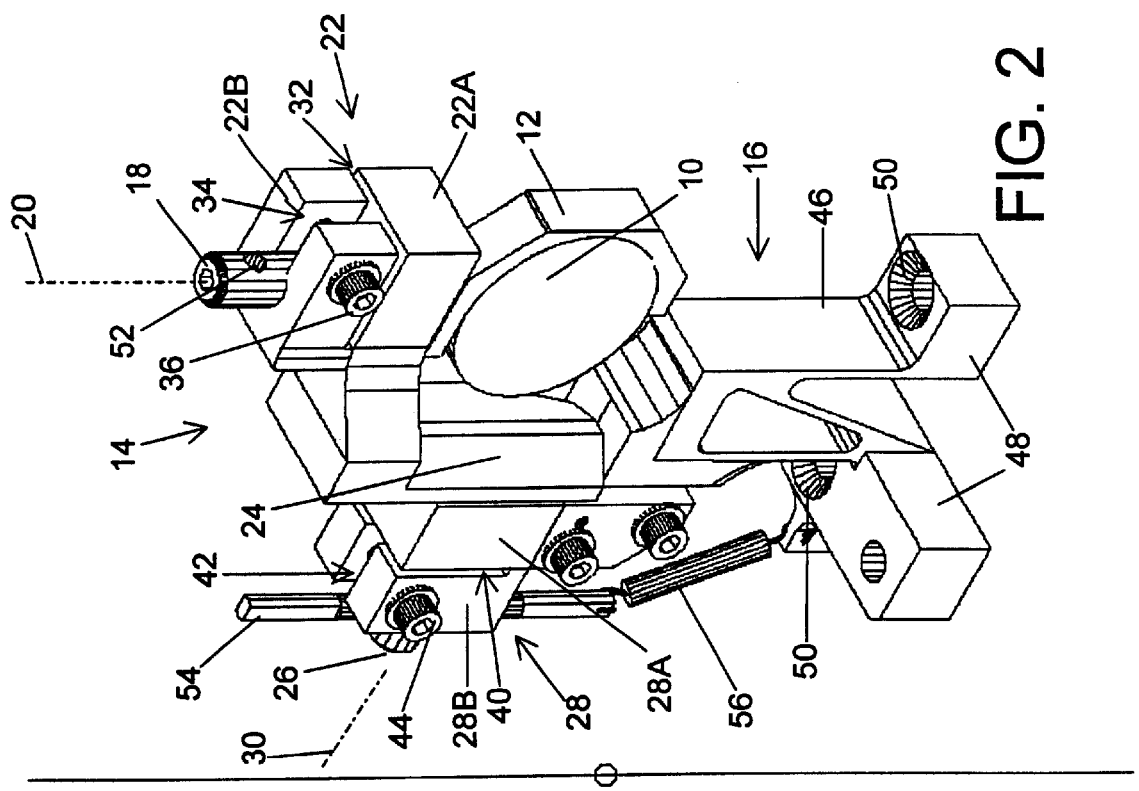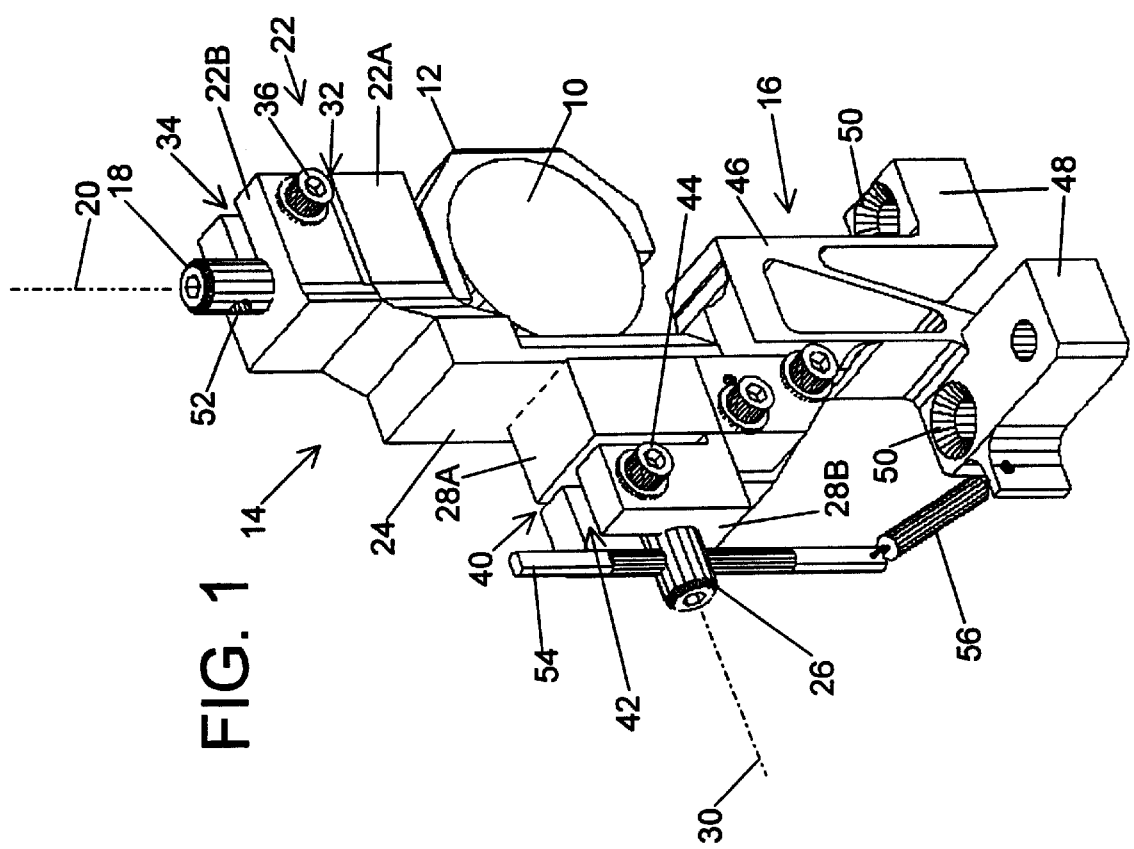

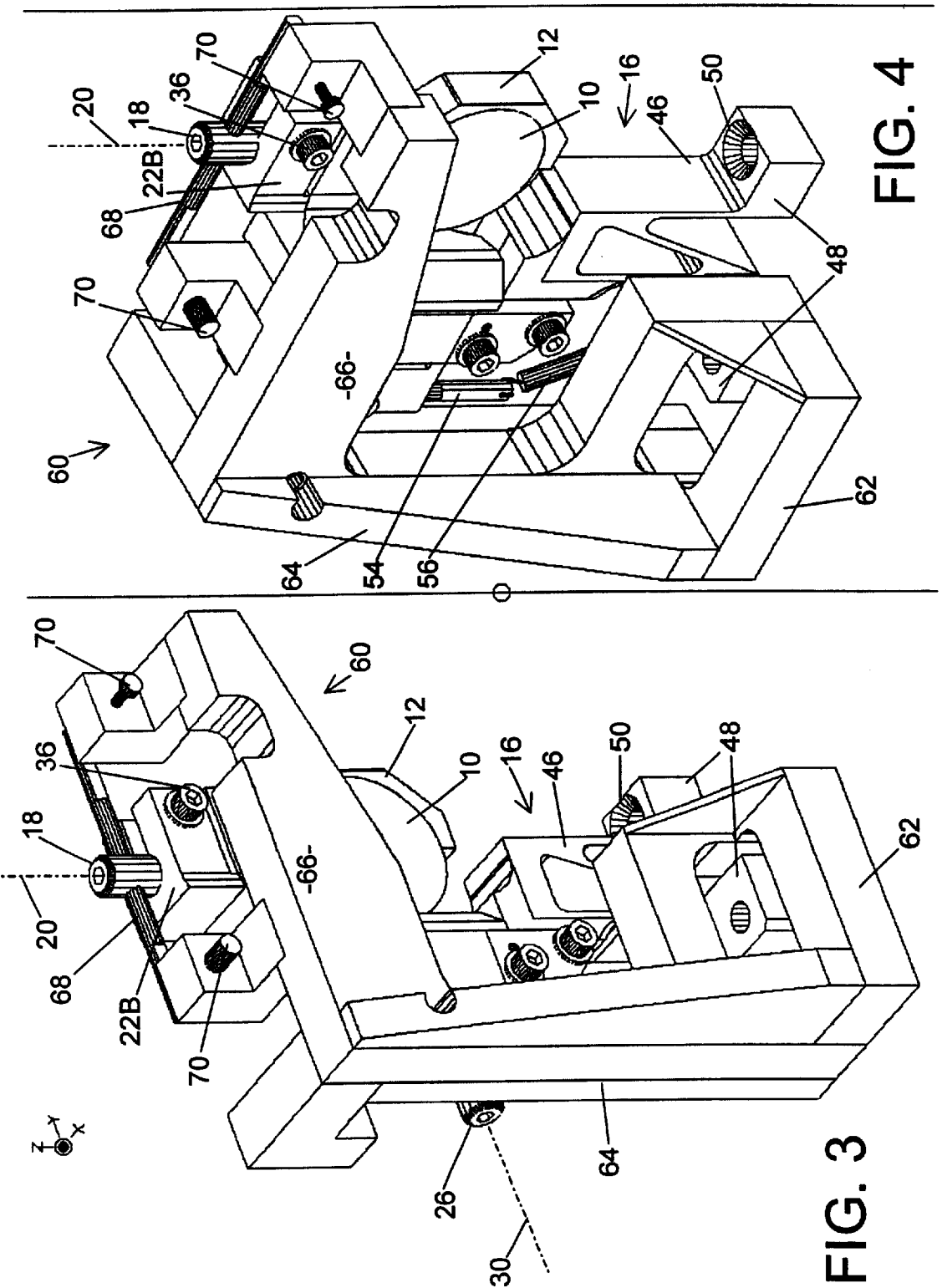

VIBRATION HARDENED MIRROR MOUNT WITH ALIGNMENT FRIENDLY LOCKING

This invention was made with Government support under Contract No. F29601-97-C-0001 to the United States Air Force.

BACKGROUND OF THE INVENTION

This invention relates generally to optical components and, more particularly, to adjustable mounting structures for optical components, such as precision mirrors. A laser system typically includes a laser source and an optical beam train, i.e., a series of precision optical components that affect the cross section and direction of the laser beam, as required for a particular application. Highly reflective elements, referred to as mirrors, redirect the beam as needed. The mirrors are mounted on stands that have an angular adjustment capability, usually about two perpendicular axes. The required sensitivity of beam steering must be incorporated into the mirror mount adjustment resolution for each axis. Once a mirror is adjusted to a desired orientation, the mount is locked in position, to restrain the mirror from moving to another position. In some laser systems the mirror mount resolution requirement is less than 20 microradians. This high level of resolution is difficult to achieve and maintain in adverse environments that include vibration, shock loads, acoustic loads fluid flow jitter or thermal loads. In mirror mounts available prior to this invention, the locking mechanisms themselves may induce residual loads in the mirror mount structure, and these induced loads may move the mirror more than 20 microradians. Ideally, therefore, a mirror mount must not only have a high resolution capability, to match the adjustment resolution required for the mirror, but actuation of the locking mechanism must not result in unwanted mirror movement in excess of the resolution requirement. Further, the mount should be resistant to angular movements induced by vibration, shock loads, acoustic loads fluid flow jitter or thermal loads. The present invention is directed to these ends.

SUMMARY OF THE INVENTION

The present invention resides in a precision mirror mount that can be angularly adjusted to a high degree of resolution, and then locked in position without significantly affecting the angular adjustments. Briefly, and in general terms, the adjustable mirror mount of the invention comprises a mirror holder, for bonding to a mirror; a rod having a rotation axis and rigidly connected to the mirror holder; a mount stage, having a mounting block with a hole for engaging the rod for rotation therein; and means for rotating the rod and thereby adjusting the mirror in angular orientation with respect to the rotation axis of the rod. The mounting block includes a locking mechanism for securing the rod in the mounting block, and the locking mechanism applies only radial forces to the rod. The mounting block also includes means for isolating locking forces within the locking mechanism.

More specifically, the locking mechanism includes a first slot in the mounting block, extending from an external face of the mounting block to the hole engaging the rod, in a plane generally coincident with the rotation axis; and a locking screw extending across the slot to apply a clamping force to the rod when tightened. The means for isolating locking forces includes a second slot in the mounting block, extending substantially through the mounting block and dividing the mounting block into first and second portions. The first slot extends only through the first portion of the mounting block, and the second slot serves to isolate the locking forces to the first portion of the mounting block.

Optionally, the means for rotating the rod and thereby adjusting the mirror includes adjustment tooling having a support frame, an adjustment arm extending through a diametric hole in the rod, and at least one adjustment screw extending through a portion of the support frame and engaging the adjustment arm at a selected distance from the rotation axis of the rod.

If the mirror mount is to be adjustable about two axes of rotation, the mount further comprises a second rod having a second rotation axis perpendicular to the first rotation axis, the second rod being rigidly connected to the mount stage; a mount stand, having a second mounting block with a hole for engaging the second rod for rotation therein; and means for rotating the second rod and thereby adjusting the mount stage and the mirror in angular orientation with respect to the second rotation axis. The second mounting block also includes a second locking mechanism for securing the second rod in the second mounting block, and the second locking mechanism applies only radial forces to the second rod. The second mounting block also includes means for isolating locking forces within the second locking mechanism.

The means for rotating the first and second rods and thereby adjusting the mirror optionally includes adjustment tooling having a support frame, first and second adjustment arms extending through diametric holes in the first and second rods, and first and second adjustment screws extending through portions of the support frame and engaging the first and second adjustment arms at selected distances from the respective rotation axes.

It will be appreciated from the foregoing summary that the present invention represents a significant advance in precision mirror mounts. In particular, the invention provides a reliable technique for adjusting the mirror angular orientation about two perpendicular axes to a high degree of resolution, and then locking the angular positions without significantly affecting the adjustments that have been made. Other aspects and advantages of the invention will become apparent from the following more detailed description, taken in conjunction with the drawings, of which the following is a brief description.

BRIEF DESCRIPTION OF THE DRAWINGS

FIG. 1 is a first perspective view of the mirror mount of the present invention;

FIG. 2 is a second perspective view of the mirror mount, as seen from a different viewpoint;

FIG. 3 is a perspective view of the mirror mount similar to FIG. 1, but depicted to include mirror mount adjustment tooling in an operative position; and FIG. 4 is a perspective view of the mirror mount similar to FIG. 2, but depicted to include the mirror mount adjustment tooling in an operative position.

DESCRIPTION OF THE PREFERRED EMBODIMENT

As shown in the drawings for purposes of illustration, the present invention pertains to an angularly adjustable, precision mirror mount for use in a laser beam optical train. An ideal mirror mount of this type must be angularly adjustable about two axes of rotation, to a high level of resolution that is typically less than 20 microradians, must be able to maintain this level of resolution when locked in a desired position, and must maintain the required level of resolution in the presence of vibration and other loads. Some mounts pivot the mirror on a ball joint at one edge, and move the mirror by a screw near the opposite edge. Other mounts employ a flexure near the mirror center, and pivot the mirror by screws working in opposition at the mirror edges. In these and other angularly adjustable mirror mounts, the locking mechanisms inevitably induce residual loads in the mount and in the mirror itself. Fine levels of resolution cannot be easily achieved because the loads induced by the locking mechanisms may move the mount out of adjustment by more than the desired level of resolution. When the optical train includes multiple mirrors, the errors in mirror angles are cumulative, and the problem is further aggravated.

In accordance with the present invention, a mirror mount may be precisely adjusted in angular orientation and then locked in position without significantly disturbing the angular adjustments. The locking mechanism of the invention not only provides relatively high clamping forces to secure the mount in mechanically harsh environments, but also isolates the locking forces and minimizes unwanted mirror movements that can be caused by locking.

As shown in FIGS. 1 and 2, the mirror mount of the present invention supports a mirror, indicated by reference numeral 10, in a support piece or mirror cell 12, and further includes a mirror mount second stage 14 and a mirror mount stand 16. These basic components will be described in more detail below.

The mirror cell 12 is bonded rigidly to the mirror 10. As shown by way of example in the drawings, the mirror 10 is a plane mirror of approximately circular cross section and aligned in an approximately vertical plane. It will be understood that the terms "vertical" and "horizontal" are used only as descriptive terms for ease of reference to the drawings. The invention is not in any way limited to the orientations described. The mirror cell 12 is a U-shaped element shaped to fit in bonded contact with approximately half of a circumferential edge of the mirror 10. A threaded rod 18 is integral with, or rigidly connected to, the mirror cell 12, extending away from the mirror 10 and having a longitudinal axis 20 that is approximately coplanar with the mirror surface. As shown in the drawings, the threaded rod 18 has a generally vertical axis, and is engaged with a threaded hole in a block 22 that is a segment of the mount second stage 14.

The mount second stage 14 is a generally L-shaped structure, having a generally horizontally oriented segment that includes the block 22 with which the threaded rod 18 is engaged, and also having an integral, generally vertically oriented segment 24 extending down in a position adjacent to the mirror 10. Rotation of the threaded rod 18 rotates the mirror 10 about the longitudinal axis 20. If only one axis of angular adjustment is needed in a particular application, the mount second stage 14 may be secured directly to a fixed frame, such as the mirror mount stand 16. In the more general case, angular adjustment of the mirror 10 about two perpendicular axes is required. To achieve angular adjustment about a horizontal axis, the mount second stage 14 is coupled to the mirror mount stand 16 using a similar mechanism to the threaded rod 18 and block 22. A second threaded rod 26 is formed integrally with, or rigidly connected to, the segment 24 of the mount second stage 14. The second threaded rod 26 extends horizontally in a direction away from the mirror 10, and engages a threaded hole in a block 28 that is an integral part of the mirror mount stand 16, or is rigidly connected to the mount stand. Rotation of the second threaded rod 26 about its longitudinal axis 30 rotates the mount second stage 14, and with it the mirror cell 12 and mirror 10 about this horizontal axis 30.

The block 22 through which the first threaded rod 18 passes includes a slot 32 aligned in a plane perpendicular to the rod axis 20, and extending a substantial distance through block, including a portion of the block that encompasses the cross section of the rod. Thus the rod 18 engages a lower portion 22A of the block 22 and an upper portion 22B. The upper portion 22B of the block 22 has another slot 34 aligned in a vertical plane substantially parallel to the plane of the mirror 10, and extending from one face of the block all the way to the threaded rod 18. A locking screw 36 passes through the upper portion 22B of the block 22, perpendicular to the slot 34 and generally perpendicular to the mirror 10. Tightening the locking screw 36 tends to close the slot 34 and clamps the threaded rod 18 securely in the block 22. The clamping forces applied by the locking screw 36 are radial with respect to the threaded rod 18. Therefore, the forces have negligible effect on the mirror 10. The slot 32 functions to isolate the locking forces to the upper half 22B of the block 22. Therefore, the locking forces have little or no effect on the other segment 24 of the mount second stage 14 and, therefore, little or no effect on the horizontal axis adjustment of the mirror 10.

Locking the angular position of the mirror with respect to the horizontal axis 30 is effected by a similar mechanism included in the block 28 of the mirror mount stand 16. Specifically, the block 28 includes a slot 40 perpendicular to the axis 30, and dividing the block into a first portion 28A adjacent to the second stage segment 24, and a second portion 28B. The second portion 28B has slot 42 extending all the way to the second threaded rod 26. A locking screw 44 extends across this second slot 42 and clamps the second threaded rod 26 with respect to the mirror mount stand 16. Like the slot 32 in mounting block 22, the slot 40 in mounting block 28 isolates the locking forces and minimizes the transfer of these forces, in this case to the mirror mount stand 16.

The mirror mount stand 16 may be of any convenient shape, and is shown as including a base 46 rigidly connected to the block 28, and having one or pedestal portions 48 with through holes 50 for mounting screws (not shown).

Angular adjustment of the mirror 10 is effected by rotation of the threaded rods 18 and 26. For this purpose, each of these rods has a diametric hole near its end, as indicated at 52 for rod 18. These diametric holes each accommodate an adjustment arm, one of which is shown at 54, engaged with the threaded rod 26. A coiled tension spring 56 connects one end of the arm 54 to the base pedestal 48 of the mirror mount stand 16. The spring 56 biases the threaded rod 26 downward and compensates for the relatively large weight of the mount second stage 24 and the mirror cell 12. Without the spring 56, this weight would apply an unwanted torque to the rod 26, about a horizontal axis perpendicular to the rod.

FIGS. 3 and 4 show the same apparatus as FIGS. 1 and 2, but further depict mirror mount adjustment tooling, indicated generally by reference numeral 60. The adjustment tooling 60 may be securely clamped to the mirror mount, or independently mounted in any fashion that precludes unwanted relative movement of the two structures. The adjustment tooling is shown as including a base segment 62, an integral tower segment 64, and an integral cantilevered segment 66 extending generally parallel with the base segment, into operative engagement with adjustment arm 54 through threaded rod 26, and adjustment arm 68 through threaded rod 18. The adjustment tooling 60 further includes a number of fine-threaded screws, two of which are shown at 70, protruding from a portion of the cantilevered segment 66 and engaging the adjustment arms 66 to effect rotation of the threaded rod 18. A similar arrangement of fine-threaded screws (not shown) is employed to rotate the other threaded rod 26 by bearing on the other adjustment arm 54. By appropriate selection of the thread pitch of the fine-threaded screws, such as the screws 70, and selection of the lever arm or radius at which these screws act on the adjustment arms 54 and 68, a desired level of adjustment resolution can be obtained for each axis of rotation.

Typically, adjustment of the mirror angular position is performed while aiming a light beam reflected from the mirror 10 towards a target (not shown). Once the desired mirror orientation angle has been achieved, the locking screws 36 and 44 are tightened to clamp the two threaded rods 18 and 26 in their selected positions. The adjustment tooling 60 may then be removed, and normally would be removed to minimize equipment weight in an airborne or spacecraft application.

Because the clamping forces in the described locking mechanism are relatively high, the mirror in a locked configuration is extremely resistant to movement induced by vibration, shock, acoustic fluid flow jitter or thermal loads. Further, because the locking forces are mechanically isolated, operation of the locking mechanism has little or no effect on the selected angular position of the mirror. The locking screw locations 36 and 44 are located so that locking forces generated by such tooling as alien keys do not cause mirror tilt. These locking force vectors are parallel to the mirror surface plane.

It will be appreciated from the foregoing that the present invention represents a significant advance in the field of precision mirror mounts. In particular, the invention provides a mirror mount in which the mirror can be adjusted to a high level of resolution (20 microradians or less), and can be locked in the selected position without significantly affecting the angular position. Moreover, the locking mechanism is secure enough to resist movements induced by vibration, shock, acoustic and thermal loads. It will also be appreciated that although a specific embodiment of the invention has been illustrated and described in detail, various modifications may be made without departing from the spirit and scope of the invention. For example, the threaded rods 18 and 26 described as engaging threaded holes may be replaced by precision rods (without threads) engaging holes in a very close fit that allows relative rotation for angular adjustment of the mirror. Accordingly, the scope of the invention should not be limited by the structural details described and illustrated, but only by the claims that follow.

What is claimed is:

1. An adjustable mirror mount, comprising:
   a mirror holder, for bonding to a mirror;
   a rod having a rotation axis and rigidly connected to the mirror holder;
   a mount stage, having a mounting block with a hole for engaging the rod for rotation therein; and
   means for rotating the rod and thereby adjusting the mirror in angular orientation with respect to the rotation axis of the rod;
   wherein the mounting block includes a locking mechanism for securing the rod in the mounting block, and wherein the locking mechanism applies only radial forces to the rod, and wherein the mounting block also includes means for isolating locking forces within the locking mechanism.

2. An adjustable mirror mount as defined in claim 1, wherein the locking mechanism includes:
   a first slot in the mounting block, extending from an external face of the mounting block to the hole engaging the rod, in a plane generally coincident with the rotation axis; and
   a locking screw extending across the slot to apply clamping force to the rod when tightened.

3. An adjustable mirror mound as defined in claim 2, wherein:
   the means for isolating locking forces includes a second slot in the mounting block, extending substantially through the mounting block and dividing the mounting block into first and second portions; and
   the first slot extends only through the first portion of the mounting block, and the second slot serves to isolate locking forces to the first portion of the mounting block.

4. An adjustable mirror mount as defined in claim 1, wherein the means for rotating the rod and thereby adjusting the mirror includes adjustment tooling having:
   a support frame;
   an adjustment arm extending through a diametric hole in the rod; and
   an adjustment screw extending through a portion of the support frame and engaging the adjustment arm at a selected distance from the rod.

5. An adjustable mirror mount as defined in claim 1, and further comprising:
   a second rod having a second rotation axis perpendicular to the first rotation axis, the second rod being rigidly connected to the mount stage;
   a mount stand, having a second mounting block with a hole for engaging the second rod for rotation therein; and
   means for rotating the second rod and thereby adjusting the mount stage and the mirror in angular orientation with respect to the second rotation axis;
   wherein the second mounting block also includes a second locking mechanism for securing the second rod in the second mounting block, and wherein the second locking mechanism applies only radial forces to the second rod, and wherein the second mounting block also includes means for isolating locking forces within the second locking mechanism.

6. An adjustable mirror mount as defined in claim 5, wherein the first and second locking mechanisms each include:
   a first slot in the first or second mounting block, extending from an external face of the mounting block to the hole engaging the first or second rod, in a plane generally coincident with the first or second rotation axis; and
   a locking screw extending across the slot to apply clamping force to the first or second rod when tightened.

7. An adjustable mirror mount as defined in claim 6, wherein:
   the means for isolating locking forces includes a second slot in each mounting block, extending substantially through the mounting block and dividing the mounting block into first and second portions; and
   the first slot extends only through the first portion of each mounting block, and the second slot serves to isolate locking forces to the first portion of each mounting block.

8. An adjustable mirror mount as defined in claim 7, wherein:
the mirror has a mirror plane, and
the locking screw being located such that the locking forces are parallel to the mirror plane.

9. An adjustable mirror mount as defined in claim 5, wherein the means for rotating the first and second rods and thereby adjusting the mirror includes adjustment tooling having:
a support frame;
first and second adjustment arms extending through diametric holes in the first and second rods; and
first and second adjustment screws extending through portions of the support frame and engaging the first and second adjustment arms at selected distances from the respective rods.

10. An adjustable mirror mount for adjusting and locking a mirror in angular orientation about two perpendicular axes, the mirror mount comprising:
a mirror holder, for bonding to a mirror;
a first rod having a first rotation axis and rigidly connected to the mirror holder;
a mount stage, having a mounting block with a hole for engaging the rod for rotation therein;
means for rotating the rod and thereby adjusting the mirror in angular orientation with respect to the rotation axis of first the rod, wherein the mounting block includes a locking mechanism for securing the rod in the mounting block, and wherein the locking mechanism applies only radial forces to the rod, and wherein the mounting block also includes means for isolating locking forces within the locking mechanism;
a second rod having a second rotation axis perpendicular to the first rotation axis, the second rod being rigidly connected to the mount stage;
a mount stand, having a second mounting block with a hole for engaging the second rod for rotation therein; and
means for rotating the second rod and thereby adjusting the mount stage and the mirror in angular orientation with respect to the second rotation axis, wherein the second mounting block also includes a second locking mechanism for securing the second rod in the second mounting block, and wherein the second locking mechanism applies only radial forces to the second rod, and wherein the second mounting block also includes means for isolating locking forces within the second locking mechanism.

11. An adjustable mirror mount as defined in claim 10, wherein the means for rotating the first and second rods and thereby adjusting the mirror includes adjustment tooling having:
a support frame;
first and second adjustment arms extending through diametric holes in the first and second rods; and
first and second adjustment screws extending through portions of the support frame and engaging the first and second adjustment arms at selected distances from the respective rods.

12. An adjustable mirror mount as defined in claim 10, wherein:
the mirror has a mirror surface plane, and
the mount stand further comprises flexures which are configured to be parallel to the mirror surface plane.

* * * * *